Nov. 29, 1960     ZENJI WAKIMOTO     2,961,916

RANGEFINDER ATTACHMENT FOR PHOTOGRAPHING NEARBY OBJECTS

Filed July 31, 1957

INVENTOR.
ZENJI WAKIMOTO
BY
ATTORNEY

United States Patent Office 2,961,916
Patented Nov. 29, 1960

2,961,916

RANGEFINDER ATTACHMENT FOR PHOTOGRAPHING NEARBY OBJECTS

Zenji Wakimoto, Tokyo, Japan, assignor to Nippon Kogaku K.K., Tokyo, Japan, a corporation of Japan Filed July 31, 1957, Ser. No. 675,356

2 Claims. (Cl. 88—2.4)

The present invention relates to a rangefinder attachment and more particularly to an attachment of a telescopic system to a rangefinder for photographing nearby objects.

It is known that a photographic objective with an attachment having a convex converging focal length can be used for photographing nearby objects. However, all coupled rangefinders of cameras have predetermined angles of deviation for distances between infinity and nearby positions. When an attachment is affixed to a photographic objective, the angle between distant and nearby positions of the photographable distance of the object is not, in general, equal to the angle of deviation of the rangefinder, so that any rangefinder, designed to be adjustable to photograph objects lying between infinity and a nearby position, is not applicable in coupling operation with any random photographic objective provided with an attachment. For a rangefinder having attached thereto a telescope produces an angle of deviation in reverse ratio to the magnification power of the telescope.

An object of the rangefinder attachment according to the present invention is to provide a rangefinder of any photographic camera in coupling operation without making any mechanical changes for photographing nearby objects by attaching to any rangefinder a telescope of any suitable design including a deviating prism, so that the magnitude of the angle of deviation passing through the telescope coincides precisely with the angle between the distant position and the nearby position of the photographable distance of the object for the photographic objective with the attachment.

A clearer conception of the scope and purpose of the present invention may be obtained from the following description, taken in connection with the attached drawing, in which.

Figure 3:
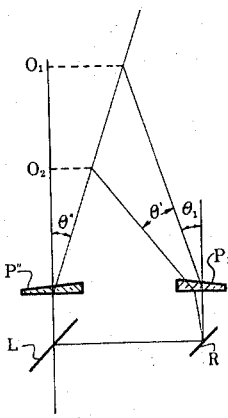
Figure 4:
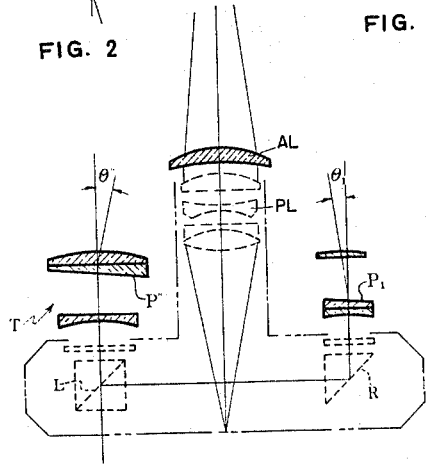

Fig. 3 illustrates the condition of parallax correction performed by means of the difference of optical axis between that of a photographic objective and that of a deviating prism attached to a rangefinder window when the optical axis of said deviating prism is tilted toward the object, and Fig. 4 illustrates optical system of an illustrative embodiment of a rangefinder with the attachment according to the present invention.

Figure 1:
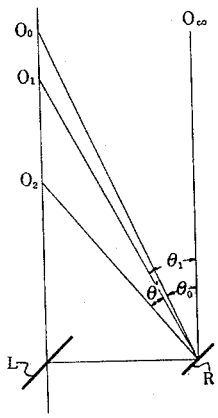
Fig. 1 is a diagram illustrating the deviation angles corresponding to various distances of the object from the camera, and is an explanatory illustration of the theory of the present invention.

Referring to the drawing when the positions of objects within the range available for the coupling application of a rangefinder (Fig. 1) having a reflecting prism R and a semi-transparent prism L are given as ranging between infinity O∞ and the nearby position $O_0$, the magnitude of the angle of deviation is denoted by $\theta_0$. When the position of the object, within the photographable range of the photographic objective with an attachment according to the present invention, is denoted by $O_1$ for the distant object and by $O_2$ for the nearby object, and a deviating prism $P_1$ having the angle of deviation $\theta_1$ is attached to the rangefinder window, the distant position of the rangefinder is adjustable to bring it to correspond exactly to the distant position $O_1$ of the object. However, the mere addition of a deviating prism $P_1$ attached to a rangefinder inevitably produces an angle error of $\theta_0 - \theta'$ for the nearby position, since the angle $\theta'$ formed by the distance between the distant object $O_1$ and the nearby object $O_2$ does not necessarily correspond to the amount of the angle of deviation $\theta_0$ of the rangefinder.

Figure 2:
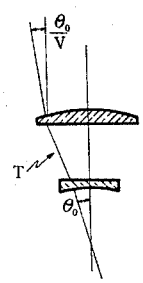
Figure 2 illustrates the change in magnitude of the angle of deviation when a telescope of magnifying power V is attached to a rangefinder window.

As shown in Fig. 2 when a telescope T having a magnifying power V is attached to the rangefinder window, the magnitude of the angular deviation of the rangefinder changes to $\theta_0/V$, so that by selecting an appropriate magnifying power V for the telescope the requisite condition of $\theta_0/V - \theta' = 0$ can be satisfied to readily eliminate the aforesaid angle error $\theta_0 - \theta'$ as a result.

It should be noted that the angle of deviation $\theta_1$ of the deviating prism $P_1$ and the magnifying power V of the telescope can be selectively determined in a suitable way in accordance with the position at which they are attached and furthermore the relative position between the deviating prism and the telescope may suitably be selected so that said prism may be combined with the telescope either in front, midway or at the rear thereof. It follows therefore that an objective lens or eye-piece of the telescope may be utilized for the performance of the deviating prism.

It is obvious that a telescope is similarly attached to the finder window when a telescope is attached to the rangefinder window. When the two images of the rangefinder are of different magnification, the magnifying power of the telescope to be attached to the finder window must be suitably selected so that the aforesaid error may be eliminated completely.

As shown in Fig. 3 when a deviating prism P″ is attached to the finder window and its optical axis is tilted at an angle $\theta''$ toward the object, any parallax due to the difference between the finder axis and the optical axis of the photographic objective can readily be corrected so that $\theta_1$ and $\theta'$ will be as shown in Fig. 3.

In Fig. 4 the optical system of an illustrative embodiment of the present invention is shown in full lines while the optical system of the conventional rangefinder is shown in dotted lines.

Since the magnifying power of the telescope can be selectively changed so that the magnitude of the angle of deviation of the rangefinder can be made to correspond with the amount of the angle of deviation for the distance between any objects, the rangefinder attachment according to the present invention characteristically provides for such change even when of a relatively large magnitude, by means of quite a simple structure as compared with the conventional means for changing the length of the base line of the rangefinder. It is an advantage of the present invention that the deviating prism and the telescope alike are disposable selectively at any suitable position on the optical axis of the rangefinder. Another advantage of the present invention is that when a telescope having a suitable magnifying power is also attached to the finder window in correspondence with the magnifying power of the telescope attached to the rangefinder, any error in the different magnification of two images for the nearby objects can be accurately eliminated. It is clear that, in general, $\theta_0$ is larger than $\theta'$ and, since the magnifying power of the telescope to be attached has increased magnifying power, the finder is affected similarly by the increased magnifying power. However, since the picture angle of the photographic objective is smaller when photographing nearer objects, the rangefinder attachment according to the present invention is also applicable for a finder for nearby objects in the case of a finder for a single eye rangefinder when the increased magnifying power of the finder is suitably selected.

Since parallax of the finder is produced both horizontally and vertically, it is advisable for the practical execution according to the present invention to add vertically the same amount of the angle of deviation similarly to both windows of the rangefinder.

What is claimed is:

1. An attachment for rangefinders of the coincident type having a view finder window and a rangefinder window for determining the distance of nearby objects to be photographed by a camera comprising a telescope mounted in alignment with the range finder window, the telescope consisting of a convex lens, an optical wedge and an eyepiece, said telescope having a magnifying power of $\theta_0/\theta'$, where $\theta_0$ is the deviation angle for objects at a distance from the rangefinder from infinity to a predetermined distance and $\theta'$ the deviation angle for objects spaced from and positioned between said rangefinder and said predetermined distance from the camera, whereby without mechanical change the rangefinder image is correctly representative of a picture field of the camera objective for the range of distances of objects to be photographed.

2. The rangefinder attachment according to claim 1 in which a telescope is also mounted in alignment with the view finder window, the latter telescope also consisting of a convex lens, an optical wedge and an eyepiece, said telescope having a magnifying power such that the view finder image is of the same magnification as the range finder image when its telescope is aligned with the range finder window.

References Cited in the file of this patent

UNITED STATES PATENTS 2,734,434    Leitz et al. _____ Feb. 14, 1956

OTHER REFERENCES

Germany, L19,274, printed September 15, 1955.